(12) United States Patent
Okuno et al.

(10) Patent No.: US 12,427,443 B2
(45) Date of Patent: Sep. 30, 2025

(54) GAS-LIQUID SEPARATOR

(71) Applicants: AISIN CORPORATION, Kariya (JP); TOYOTA JIDOSHA KABUSHIKI KAISHA, Toyota (JP)

(72) Inventors: Hitoshi Okuno, Kariya (JP); Takami Hosoi, Aichi-gun (JP); Hiroaki Nishiumi, Toyota (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 934 days.

(21) Appl. No.: 17/573,850

(22) Filed: Jan. 12, 2022

(65) Prior Publication Data
US 2022/0226753 A1   Jul. 21, 2022

(30) Foreign Application Priority Data

Jan. 21, 2021 (JP) .................................. 2021-007959
Dec. 9, 2021 (JP) .................................. 2021-200162

(51) Int. Cl.
*B01D 19/00* (2006.01)

(52) U.S. Cl.
CPC ..... *B01D 19/0094* (2013.01); *B01D 19/0068* (2013.01); *B01D 2257/80* (2013.01)

(58) Field of Classification Search
CPC . B01D 19/0068; B01D 19/0094; B01D 45/16
See application file for complete search history.

(56) References Cited

U.S. PATENT DOCUMENTS

2016/0256797 A1* 9/2016 Yu ...................... B01D 19/0042
2018/0375122 A1* 12/2018 Okamura ............... B01D 45/08
2019/0282942 A1   9/2019 Mishima et al.

FOREIGN PATENT DOCUMENTS

JP             2019-155334 A      9/2019

* cited by examiner

*Primary Examiner* — Bradley R Spies
(74) *Attorney, Agent, or Firm* — Oblon, McClelland, Maier & Neustadt, L.L.P.

(57) ABSTRACT

A gas-liquid separator includes a housing, an inlet in the housing, a flow passage which is in communication with the inlet and through which a water-containing gas supplied through the inlet flows in a vertical direction, a gas-flow director configured to change a flow direction of the water-containing gas flowing through the flow passage from the vertical direction to the horizontal direction, and a gas-liquid separating portion configured to bring the water-containing gas, supplied from the gas-flow director into the housing, into contact with a plurality of separation blades in sequence to separate water from the water-containing gas.

5 Claims, 10 Drawing Sheets

GAS-LIQUID SEPARATOR

CROSS REFERENCE TO RELATED APPLICATION

This application is based on and claims priority under 35 U.S.C. Section 119 to Japanese Patent Application No. 2021-007959 filed on Jan. 21, 2021 and Japanese Patent Application No. 2021-200162 filed on Dec. 9, 2021, the entire content of which are incorporated herein by reference.

TECHNICAL FIELD

This disclosure relates to a gas-liquid separator.

RELATED ART

For example, JP 2019-155334A discloses a gas-liquid separator for separating water contained in an anode off-gas discharged from an anode of a fuel cell.

In the gas-liquid separator disclosed in JP 2019-155334A, a gas-liquid separating portion is formed by arranging a plurality of collision walls extending in the vertical direction inside a bulging wall formed on the top of a housing, and an inlet is provided such that a water-containing gas is supplied in the horizontal direction onto the collision walls of the gas-liquid separating portion.

In the gas-liquid separator disclosed in JP 2019-155334A, the plurality of collision walls included in the gas-liquid separating portion are constituted by a plurality of elongated plate-shaped members, these plate-shaped members are arranged at predetermined intervals on a region having an annular shape in a plan view, the water-containing gas is supplied and swirled around in a region inside the annular region to produce a swirl flow, and thus the water-containing gas collides against the collision walls, thereby achieving separation of water.

SUMMARY

This type of gas-liquid separator is arranged near a fuel cell of a vehicle, and, for example, when the fuel cell has a configuration in which end plates are arranged on both end positions of a plurality of cells for a fuel cell that are arranged in a stacked state, the gas-liquid separator is supported by the end plate.

The end plate of the fuel cell is provided with valves and pipe lines for supplying a fuel gas and an oxidizing gas, and therefore, when the gas-liquid separator is arranged in consideration of the arrangement of these valves and pipe lines, it is anticipated that it is difficult to position the inlet for introduction of the water-containing gas at an upper portion of the housing in the horizontal direction in the same manner as in JP 2019-155334A.

In particular, in a fuel cell that includes a plurality of cells for a fuel cell, the cells for a fuel cell may be stacked in the vertical direction, the left-right direction, or the front-rear direction, and therefore, in view of the relationship between the arrangement of the gas-liquid separator relative to the end plate and the position at which the water-containing gas is discharged through the end plate, a design in which the inlet is arranged to be apart from a collision wall such as a lower portion of the housing or oriented perpendicularly to the housing is also needed.

Moreover, in the case of the gas-liquid separating portion in which water is separated due to the contact of the water-containing gas with the collision walls, it is preferable that a swirl flow is produced by supplying the water-containing gas in the horizontal direction and swirling it around as described in JP 2019-155334A because gas-liquid separation performance is improved.

For these reasons, a gas-liquid separator that has an increased degree of freedom in positioning of the inlet and performs gas-liquid separation while allowing the water-containing gas introduced through the inlet to flow in the horizontal direction is desired.

One embodiment of a gas-liquid separator according to this disclosure includes: a housing; an inlet in the housing; a flow passage which is in communication with the inlet and through which a water-containing gas supplied through the inlet flows in a vertical direction; a gas-flow director configured to change a flow direction of the water-containing gas flowing through the flow passage from the vertical direction to a horizontal direction; and a gas-liquid separating portion configured to bring the water-containing gas, supplied from the gas-flow director into the housing, into contact with a plurality of separation blades in sequence to separate water from the water-containing gas.

With this embodiment, the water-containing gas introduced through the inlet flows through the flow passage in the vertical direction, the gas-flow director changes the flowing direction of this flow from the vertical direction to the horizontal direction, and thereby the water-containing gas is supplied to the gas-liquid separating portion. In the gas-liquid separating portion, the water-containing gas successively comes into contact with the separation blades while flowing in the horizontal direction, and thus, for example, a swirl flow can be produced, thereby achieving efficient gas-liquid separation. The above configuration allows for a gas-liquid separator that includes an inlet whose position is not limited to an upper portion of the housing of the gas-liquid separator, that is, having an increased degree of freedom in positioning of the inlet, and that performs gas-liquid separation while allowing a water-containing gas introduced through the inlet to flow in the horizontal direction toward the separation blades.

In another embodiment of the gas-liquid separator according to this disclosure, the gas-liquid separating portion is at a position higher than the inlet, the flow passage is in a vertically elongated flow-passage member disposed inside the housing and configured to send the water-containing gas, introduced through the inlet, upward in the vertical direction through the flow passage, and the gas-flow director includes: a horizontal guide face disposed on an inner surface of an upper wall of the housing and configured to allow the water-containing gas, sent further upward in the vertical direction from an upper end of the flow-passage member, to flow in the horizontal direction; and a guide portion disposed at an upper end portion of the flow-passage member and configured to guide the water-containing gas toward the separation blades of the gas-liquid separating portion.

With this embodiment, the water-containing gas introduced through the inlet is sent upward in the vertical direction through the flow passage in the flow-passage member elongated in the vertical direction. The gas-flow director includes the guide face that is horizontally formed on the inner surface of the upper wall of the housing, and the guide portion that guides the water-containing gas toward the gas-liquid separating portion at the upper end portion of the flow-passage member. Accordingly, the water-containing gas that is sent further upward in the vertical direction from the upper end of the flow-passage member is sent in the horizontal direction along the horizontal guide face on the inner surface of the upper wall of the housing and is sent in the direction toward the gas-liquid separating portion by the guide portion provided at the upper end of the flow-passage member. The water-containing gas that is sent as described above comes into contact with the separation blades of the gas-liquid separating portion, and thereby gas-liquid separation is achieved.

In another embodiment of the gas-liquid separator according to this disclosure, the flow-passage member is integral with a holder held on an inner surface of the housing.

With this embodiment, by allowing the holder to be supported by the inner surface of the housing, for example, during the assembly of the gas-liquid separator, the flow-passage member is allowed to be supported by the housing via the holder. As a result, it is possible to fix the flow-passage member to the housing in a positioned state without welding or bonding it to the inner surface of the housing and to allow the water-containing gas to appropriately flow therethrough.

Another embodiment of the gas-liquid separator according to this disclosure includes: a housing; an inlet on an upper side of the housing; a flow passage which is in communication with the inlet and through which a water-containing gas supplied through the inlet flows in a vertical direction; a gas-flow director configured to bring the water-containing gas, flowing through the flow passage, into contact with an inclined face to change a flow direction of the water-containing gas from the vertical direction to a horizontal direction; and a gas-liquid separating portion configured to bring the water-containing gas, supplied from the gas-flow director into the housing, into contact with a plurality of separation blades in sequence to separate water from the water-containing gas.

With this embodiment, the water-containing gas introduced through the inlet flows through the flow passage in the vertical direction, the flowing direction of this flow is changed from the vertical direction to the horizontal direction due to the contact with the inclined surface of the gas-flow director, and thereby the water-containing gas is supplied to the gas-liquid separating portion. In the gas-liquid separating portion, the water-containing gas successively comes into contact with the separation blades while flowing in the horizontal direction, and thereby efficient gas-liquid separation is achieved. That is, this configuration allows for a gas-liquid separator that even if the inlet is disposed at an upper portion of the housing and oriented vertically, performs gas-liquid separation while allowing a water-containing gas introduced through the inlet to flow in the horizontal direction toward the separation blades In another embodiment of the gas-liquid separator according to this disclosure, the separation blades are in an annular region and each extend in the vertical direction, and the gas-liquid separating portion is configured to bring the water-containing gas, whose flow direction has been changed by the gas-flow director, into contact with the separation blades and swirl the water-containing gas around into a form of a swirl flow to separate water from the water-containing gas.

With this embodiment, the water-containing gas comes into contact with the plurality of separation blades that are arranged inside the annular region and each extend in the vertical direction after the flowing direction has been changed to the horizontal direction by the gas-flow director. Particularly, in this configuration, the water-containing gas, whose flow direction has been changed by the gas-flow director, comes into contact with the plurality of separation blades provided inside the annular region and is swirled around to produce a swirl flow, and thereby efficient gas-liquid separation is achieved.

The above and other elements, features, steps, characteristics and advantages of this disclosure will become more apparent from the following detailed description of the embodiments with reference to the attached drawings.

DESCRIPTION OF EMBODIMENTS

Hereinafter, embodiments of this disclosure will be described with reference to the drawings.

Basic Configuration

Figure 1:
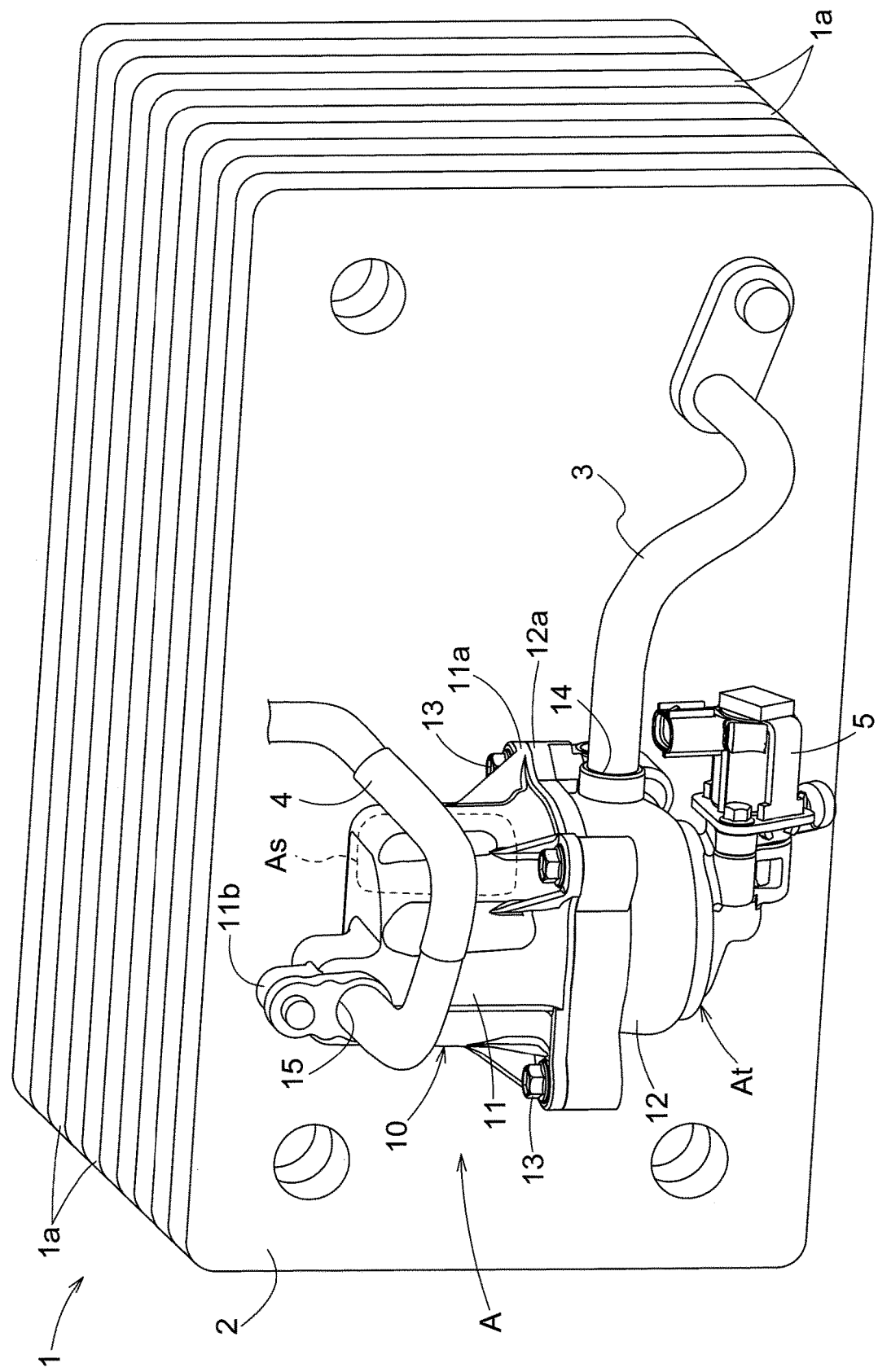
FIG. 1 is a perspective view illustrating an end plate of a fuel cell and a gas-liquid separator.

FIG. 1 shows a gas-liquid separator A provided on the outer surface of an end plate 2 of a fuel cell 1 to be mounted in a fuel cell vehicle (FCV). The gas-liquid separator A separates water that is contained in an anode off-gas (an example of a water-containing gas) supplied through an introduction passage 3, discharges, through a discharge passage 4, a dehydrated gas from which water has been removed (the dehydrated gas merges with an anode gas and returns to the fuel cell 1), and discharges separated water from the bottom portion.

The fuel cell 1 includes a plurality of cells 1a for a fuel cell that are stacked, and end plates 2 that are made of a metal material such as an aluminum material and are arranged at both end positions in the stacking direction. FIG. 1 shows only one of the two end plates 2. An anode gas (hydrogen gas) is supplied to the cells 1a for a fuel cell from the portion on which this end plate 2 is arranged, and an anode off-gas produced through reactions in the cells 1a for a fuel cell is discharged therefrom. Similarly, a cathode gas (air) is supplied to the cells 1a for a fuel cell from the portion on which this end plate 2 is arranged, and a cathode off-gas produced through reactions in the cells 1a for a fuel cell is discharged therefrom.

As shown in FIGS. 1 to 4, the gas-liquid separator A includes a housing 10 made of a resin that contains a gas-liquid separating portion As for separating water from the anode off-gas and a water storage portion At for collecting water separated in the gas-liquid separating portion As, and the bottom portion of the housing 10 is provided with an electromagnetic on-off valve 5 for opening and closing a discharge flow passage 19 extending from the water storage portion At. Also, the housing 10 has an internal space extending in the vertical direction along the central axis (not illustrated) extending in the vertical direction. This vertical direction does not merely mean a direction that extends in precisely parallel with the direction of the gravity action, but also encompasses a direction along which the upper side and the lower side can be determined based on the direction of the gravity action.

In this gas-liquid separator A, the housing 10 is provided with an inlet 14 through which the anode off-gas is introduced from the introduction passage 3, and an outlet 15 through which an anode off-gas from which water has been removed is discharged. The inlet 14 is arranged at a position lower than the gas-liquid separating portion As. The gas-liquid separator A includes a flow-passage member 6 through which the anode off-gas supplied through the inlet 14 flows to the position of the gas-liquid separating portion As and is then supplied thereto, and a gas-flow director Au through which the anode off-gas from this flow-passage member 6 flows in the horizontal direction toward the gas-liquid separating portion As.

The flow-passage member 6 forms a flow passage V through which the anode off-gas supplied through the inlet 14 flows in the vertical direction. The gas-liquid separating portion As receives an anode off-gas supplied in the horizontal direction orthogonal to the central axis of the vertical housing 10 and thereby produces a swirl flow around the central axis. The horizontal direction does not mean only the precisely horizontal direction: It may be any gas flow direction that allows the gas-liquid separating portion As to produce a swirl flow.

Gas-Liquid Separator

Figure 2:
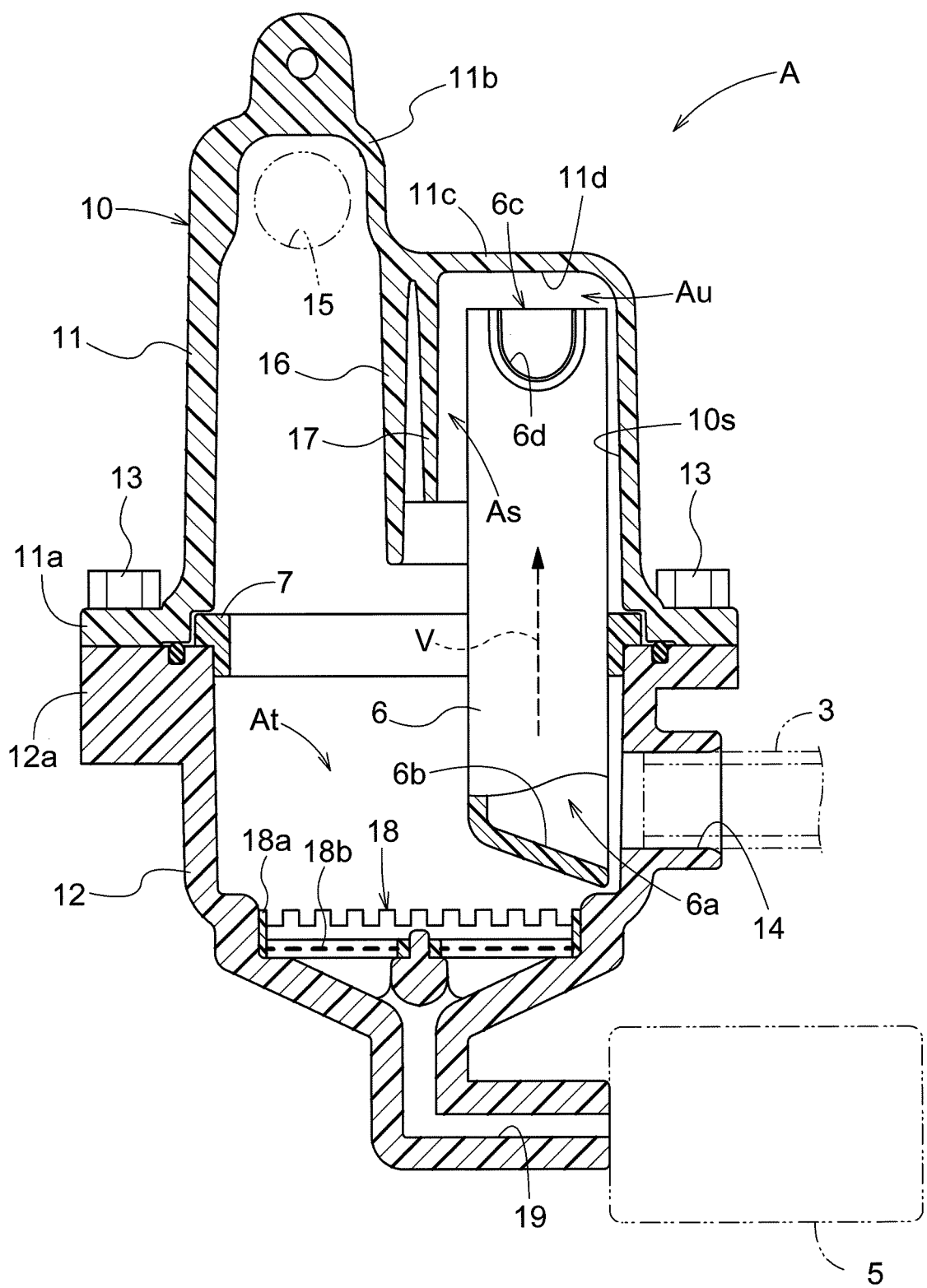
FIG. 2 is a front view of a longitudinal cross-section of the gas-liquid separator.

As shown in FIG. 2, in the gas-liquid separator A, the housing 10 includes an upper housing 11 made of a resin and a lower housing 12 made of a resin, and an upper flange 11a that is formed integrally with the upper housing 11 and a lower flange 12a that is formed integrally with the lower housing 12 are fastened to each other using a plurality of fastening bolts 13. The cross sections (cross sections as viewed in a direction extending along the central axis) of the upper housing 11 and the lower housing 12 have substantially the same shape.

Figure 3:
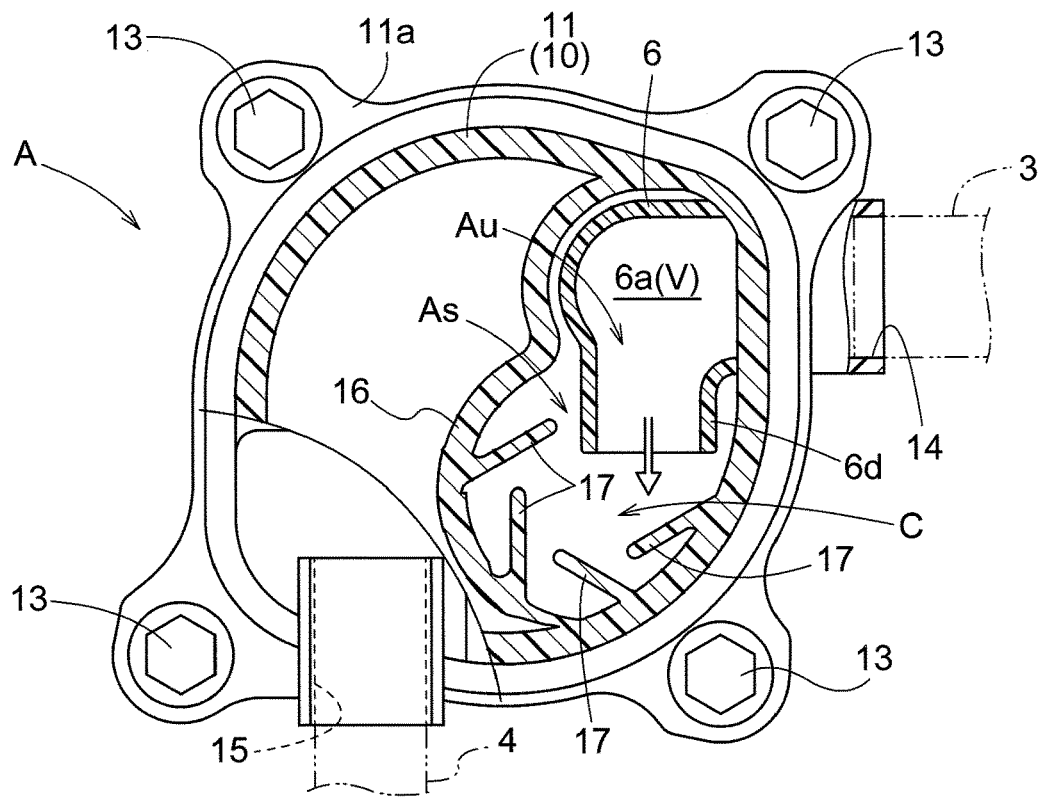
FIG. 3 is a plan view of a lateral cross-section of a portion of the gas-liquid separator that corresponds to a gas-liquid separating portion.

As shown in FIGS. 1 to 3, the gas-liquid separating portion As is arranged inside the upper housing 11, and the outlet 15 is provided which is open in the horizontal direction relative to a protruding portion 11b that protrudes upward from the upper surface of the upper housing 11. The gas-liquid separating portion As has a separation space that is delimited inside the upper housing 11 by a partition wall 16 extending downward from the lower surface of an upper wall 11c of the upper housing 11 and the inner wall of the upper housing 11. The gas-liquid separating portion As includes a plurality of plate-shaped separation blades 17 that extend downward in the vertical direction from the lower surface of the upper wall 11c into the separation space. As shown in FIG. 3, the plurality of separation blades 17 are arranged in an annular region C that has an annular shape in a plan view.

As shown in FIG. 3, the plurality of separation blades 17 are arranged at predetermined intervals in the annular region C having an annular shape in a plan view, and the orientations of the plurality of separation blades 17 in a plan view are set such that the anode off-gas supplied from the gas-flow director Au in the horizontal direction is guided toward the center of the separation space.

In this gas-liquid separator A, the lower end position of the partition wall 16 is lower than the lower end positions of the plurality of separation blades 17 as shown in FIG. 2, and thus an issue where the gas inside the separation space flows directly to the outlet 15 is suppressed.

Figure 4:
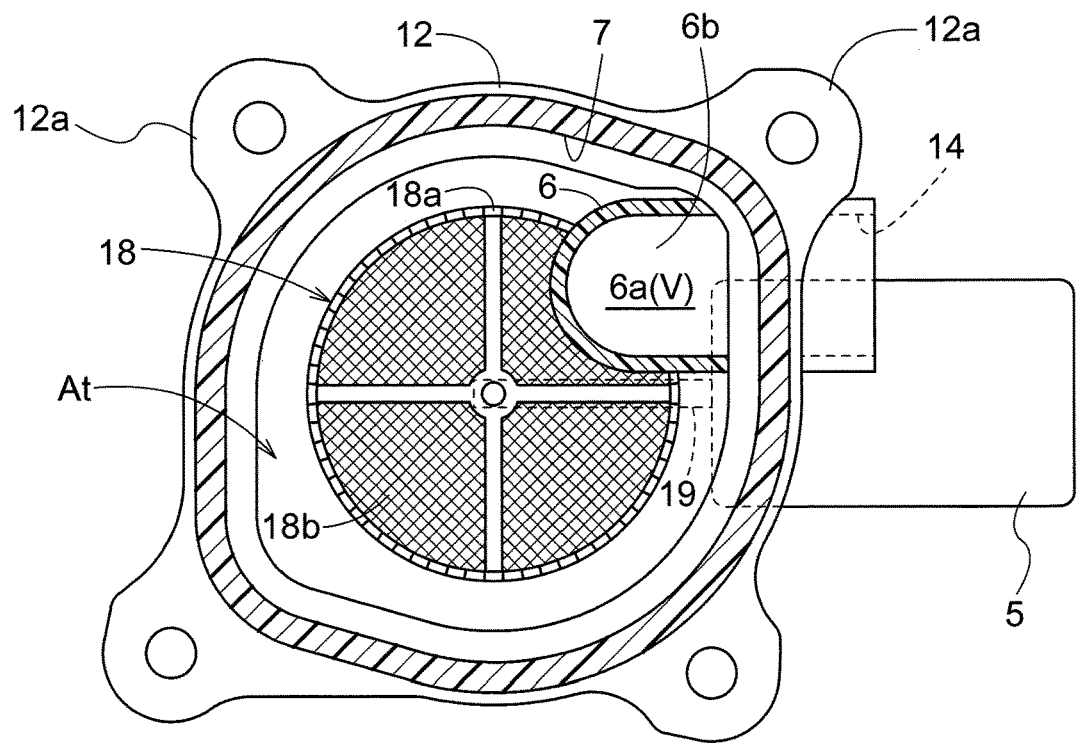
FIG. 4 is a plan view of a lateral cross-section of the bottom portion of the gas-liquid separator.

A water storage space formed on the bottom portion inside the lower housing 12 serves as the water storage portion At. A filter 18 is arranged in the water storage space as shown in FIGS. 2 and 4. The filter 18 includes a frame portion 18a having an annular shape in a plan view, and a mesh portion 18b provided on the inner circumference of the frame portion 18a. Furthermore, the above-described electromagnetic on-off valve 5 is provided so as to open/close the outer end position of the discharge flow passage 19 that is in communication with the lower end portion of the water storage space. This electromagnetic on-off valve 5 maintains the closed state when no electric current flows, and opens the discharge flow passage 19 to discharge water when an electric current flows.

Flow-Passage Member

Figure 5:
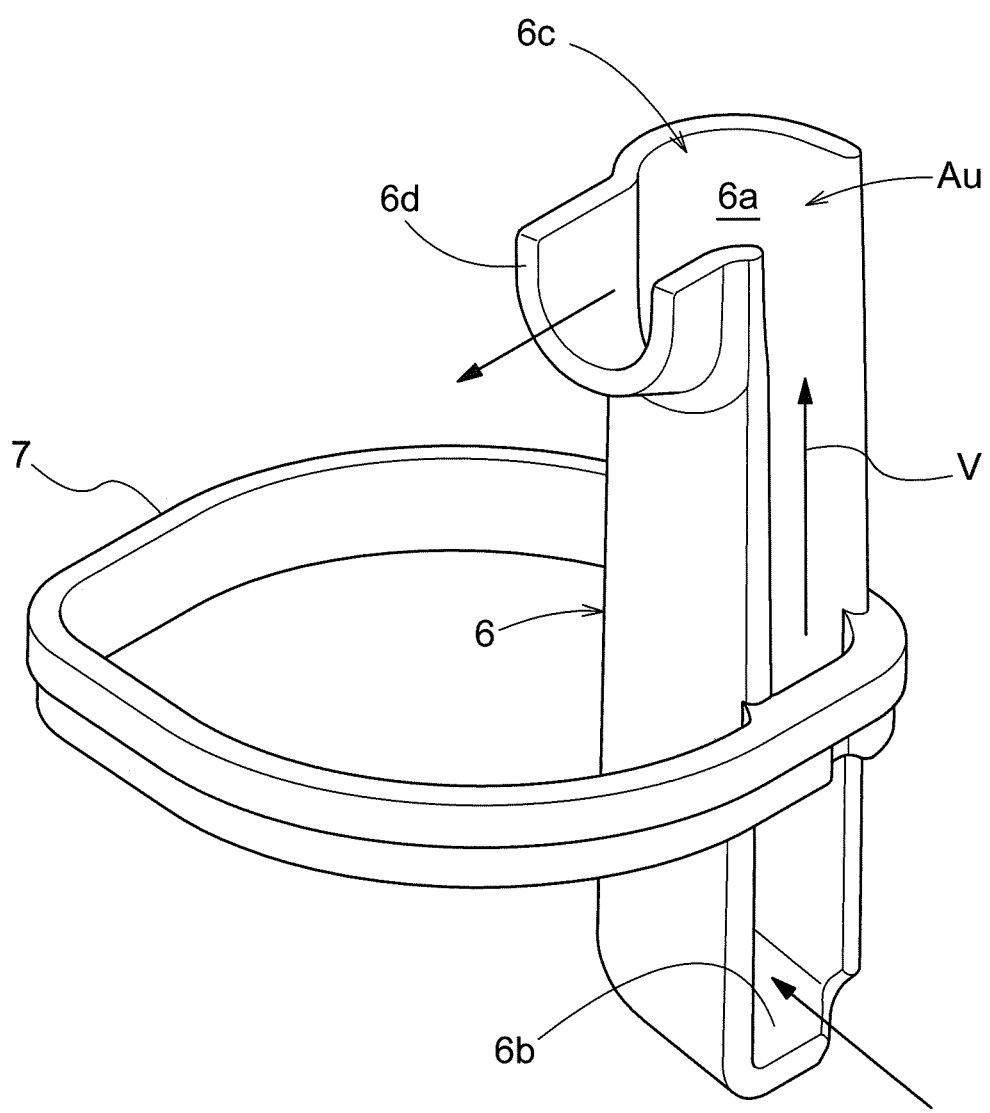
FIG. 5 is a perspective view illustrating a flow-passage member and a holder.

As shown in FIG. 5, the flow-passage member 6 includes a flow passage having a U-shaped cross-sectional shape, and is arranged extending in the vertical direction inside the housing 10. This flow-passage member 6 is formed integrally with an annular holder 7 to be held on the inner surface of the housing 10. Note that the flow-passage member 6 and the holder 7 are integrally formed using a resin material.

As shown in FIGS. 2 to 5, a flow-passage space 6a is formed between the flow-passage member 6 and the inner surface of the housing 10 by bringing the opening edge of the open region of the flow-passage member 6 extending in the vertical direction close to the vertical inner surface 10s of the housing 10 (the opening edge may also be brought into contact therewith), and this flow-passage space 6a serves as the flow passage V through which the anode off-gas flows in the vertical direction.

The holder 7 has an annular shape following the inner surface of the housing 10 in a plan view, and is held at the boundary between the upper housing 11 and the lower housing 12 in a state in which a portion of the lower portion of the holder 7 is fitted onto the inner circumference of the lower housing 12 as shown in FIG. 2. The flow-passage member 6 can be positioned inside the housing 10 by holding the holder 7 in this manner.

The length in the up-down direction (vertical direction) of the flow-passage member 6 is determined as a length from a position adjacent to the inner side of the inlet 14 to a position adjacent to the inner surface (lower surface) of the upper wall 11c of the upper housing 11. The flow-passage member 6 includes, at the lower end thereof, an introduction face 6b for guiding the anode off-gas supplied through the inlet 14, to the flow-passage space 6a (flow passage V).

The flow-passage member 6 includes, at the upper end thereof, an upper-end opening 6c that is open upward, and a guide portion 6d for guiding the anode off-gas from this upper-end opening 6c to the separation blades 17 of the gas-liquid separating portion As.

In particular, in this gas-liquid separator A, the gas-flow director Au is constituted by a guide face 11d extending in the horizontal direction that is provided on the inner surface (lower surface) of the upper wall 11c of the upper housing 11 such that the anode off-gas sent upward from the upper-end opening 6c of the flow-passage member 6 flows in the horizontal direction, and the guide portion 6d extending in the horizontal direction that is provided at the upper end of the flow-passage member 6 and guides the anode off-gas to the gas-liquid separating portion As.

With such a configuration, the anode off-gas supplied through the inlet 14 is sent upward (to the upper side in the vertical direction) from the introduction face 6b at the lower end along the flow-passage space 6a in the flow passage V of the flow-passage member 6 inside the housing 10, and is then sent toward the gas-liquid separating portion As from the upper end position of the flow-passage member 6 by the gas-flow director Au.

In the gas-flow director Au, the anode off-gas sent upward from the upper-end opening 6c of the flow-passage member 6 is sent in a direction (a direction indicated by the arrow in FIG. 3) in which the guide portion 6d at the upper end of the flow-passage member 6 extends toward one of the separation blades 17 of the gas-liquid separating portion As and that corresponds to the horizontal direction.

A swirl flow is produced in the separation space of the gas-liquid separating portion As by sending the anode off-gas in the direction as described above, and the plurality of separation blades 17 are arranged in the annular region C and each extend in the vertical direction. Accordingly, the anode off-gas rotates in the clockwise direction as viewed in the direction shown in FIG. 3 and successively comes into contact with the plurality of separation blades 17, and is thus swirled around to produce a swirl flow. The anode off-gas moves downward as such swirling is repeated, and thus water is separated. The separated water is stored in the water storage portion At, and the anode off-gas from which water has been removed passes the lower side of the lower end of the partition wall 16 and is then discharged through the outlet 15.

Functions and Effects of Embodiment

The end plate 2 includes, on the outer surface thereof, piping for supplying and discharging a cathode gas (air) in addition to the above-described introduction passage 3 and the discharge passage 4 for supplying and discharging the anode off-gas, and valves for controlling these gas flows. Moreover, a humidifier for humidifying the cathode gas, and the like are supported by the outer surface of the end plate 2. Therefore, the arrangement of the gas-liquid separator A is limited.

In view of shortening the piping and protecting the gas-liquid separator A, it is effective to arrange the gas-liquid separator A inside the outer peripheral edge of the end plate 2 as viewed in a direction orthogonal to the plate face of the end plate 2, and such an arrangement is desired.

In consideration of such a problem, a design in which the inlet 14 is arranged at a position in the housing 10 lower than the gas-liquid separating portion As is also needed. With the configuration of the embodiment above, even when the inlet 14 is arranged at a position lower than the gas-liquid separating portion As, water contained in the anode off-gas can be favorably separated.

In particular, in the gas-liquid separator A of the embodiment above, the flow-passage member 6 is provided via the holder 7 in the internal space of the housing 10, thus making it possible to arrange the flow-passage member 6 at an appropriate position in an appropriate orientation without welding or bonding the flow-passage member 6 and the holder 7 to the housing 10, send upward the anode off-gas introduced through the inlet 14, change the flow direction to the horizontal direction in the gas-flow director Au, and supply the anode off-gas to the gas-liquid separating portion As.

Moreover, the gas-flow director Au is constituted by the guide face 11d provided on the inner surface of the upper wall 11c of the housing 10 and the guide portion 6d provided at the upper end of the flow-passage member 6, and therefore, there is no need to use special members for the gas-flow director Au. Favorable water separation is achieved by precisely sending the anode off-gas toward one of the plurality of separation blades 17 from the gas-flow director Au configured as described above in the horizontal direction to produce a swirl flow.

Other Embodiments

The present disclosure may also have the following configurations other than that of the embodiment above (elements having functions that are identical with those of the embodiment are denoted by numbers or reference numerals that are identical with those in the embodiment).

Figure 6:
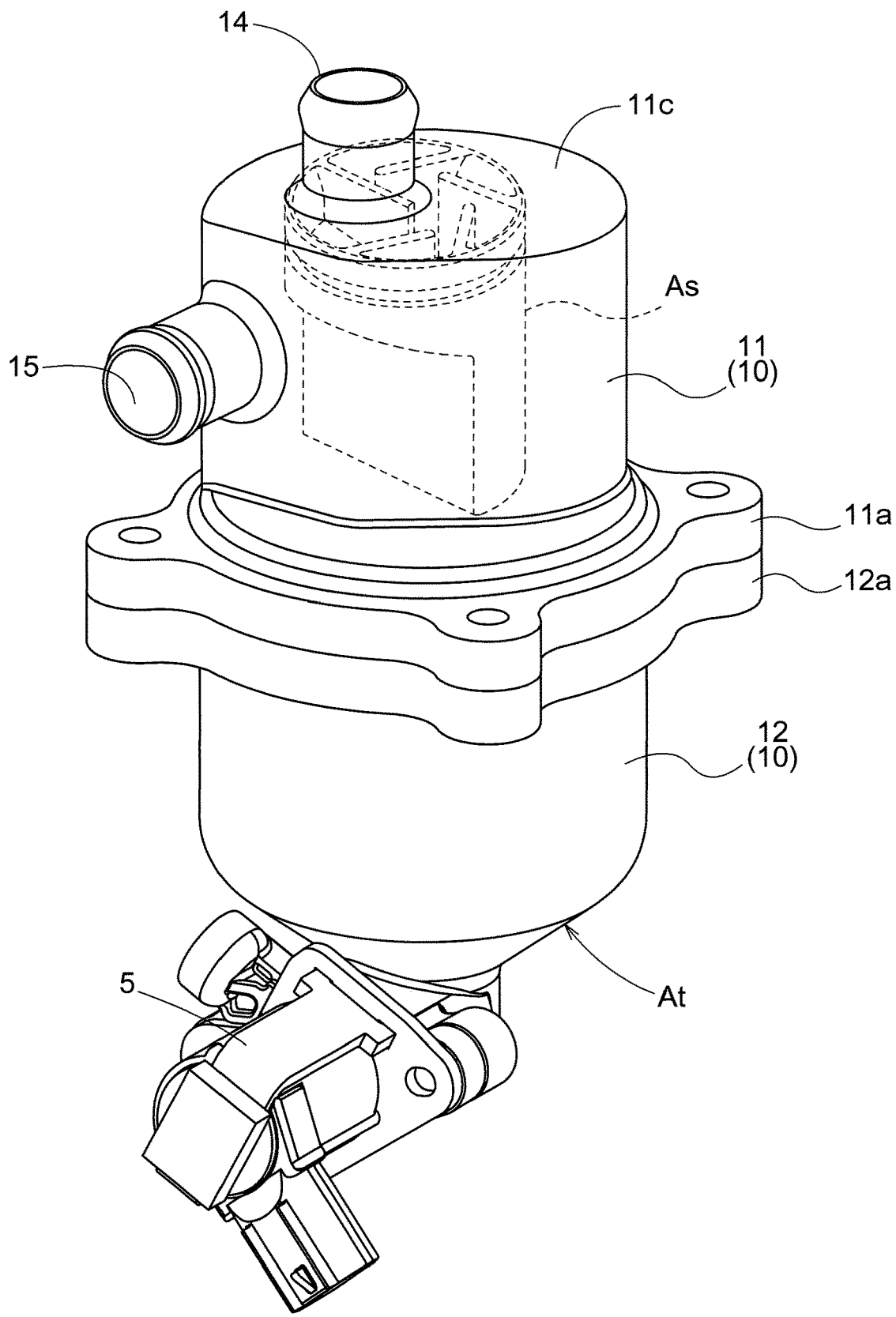
FIG. 6 is a perspective view of a gas-liquid separator in another embodiment (a).
Figure 7:
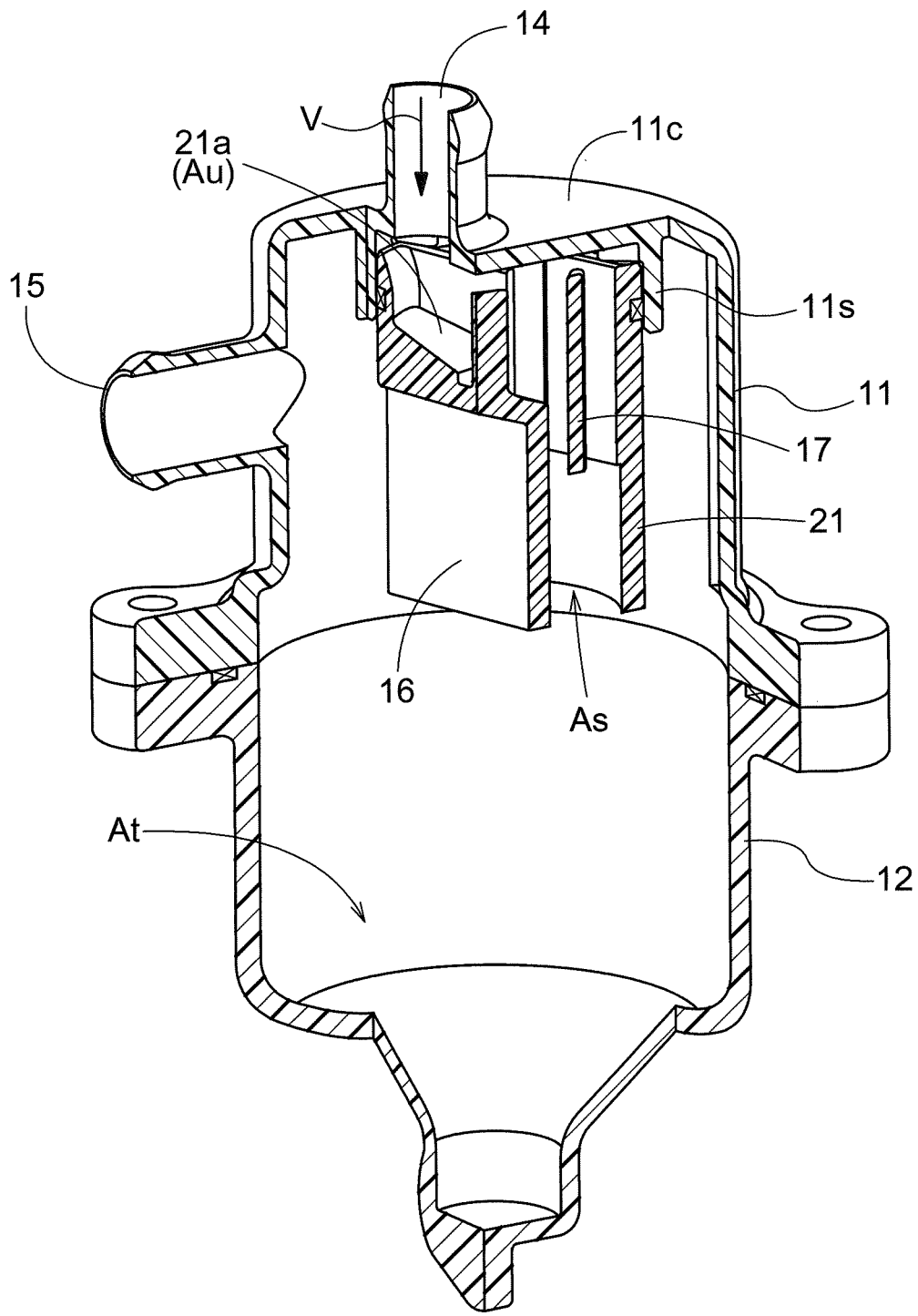
FIG. 7 is a partially cutaway perspective view of the gas-liquid separator in the other embodiment (a).

(a) As shown in FIGS. 6 and 7, the gas-liquid separating portion As is arranged inside the upper housing 11 included in the housing 10, the inlet 14 extending upward in the vertical direction is provided in the upper wall 11c of the upper housing 11, and the flow passage V that is in communication with the inlet 14 and passes through the upper wall 11c in the vertical direction and through which the anode off-gas (an example of a water-containing gas) is sent from the upper side to the lower side is provided. In addition, the gas-flow director Au for changing the flow direction of the anode off-gas flowing through the flow passage V, to the horizontal direction is provided inside the upper housing 11.

In this other embodiment (a), as shown in FIGS. 6 to 9, an annular sleeve 11s protruding downward is formed on the lower surface of the upper wall 11c of the upper housing 11, and the gas-liquid separating portion As is provided in the separation space inside a tubular body 21 that is fitted to the sleeve 11s. The tubular body 21 is provided with the flat partition wall 16 extending in the vertical direction, the plurality of separation blades 17, and an inclined face 21a serving as the gas-flow director Au.

That is, the separation space is formed between the partition wall 16 of the tubular body 21 and the outer wall of the tubular body 21, and the plurality of separation blades 17 are arranged inside the separation space. The inclined face 21a is formed in an orientation inclined to the flow passage V such that the anode off-gas supplied to the inlet 14 is supplied toward the separation blades 17 in the horizontal direction through the gas-flow director Au.

Figure 8:
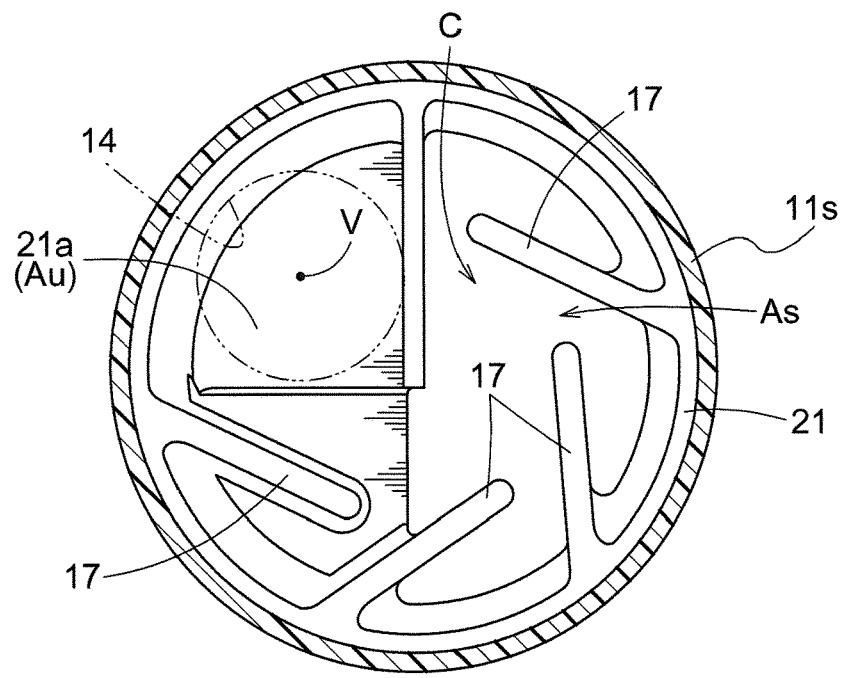
FIG. 8 is a lateral cross-sectional view of the upper portion of a tubular body in the other embodiment (a).
Figure 9:
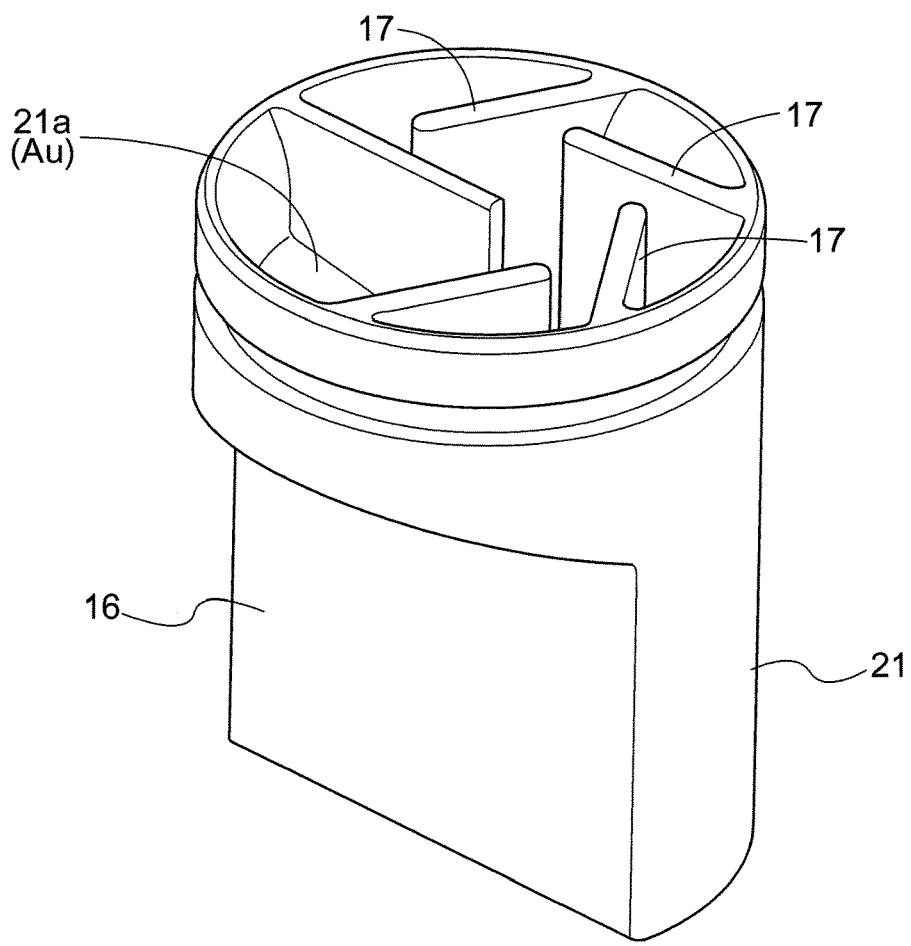
FIG. 9 is a perspective view of the tubular body in the other embodiment (a).

In this other embodiment (a), as shown in FIG. 8, the plurality of separation blades 17 each have a plate shape extending in the vertical direction and are arranged in the annular region C having an annular shape in a plan view. Moreover, the inclined face 21a serving as the gas-flow director Au is formed at a position located within the annular region in a plan view. Thus, the anode off-gas that flows through the flow passage V from the inlet 14 in the vertical direction and is then supplied to the tubular body 21 comes into contact with the inclined face 21a and is thus guided in the horizontal direction. Then, the anode off-gas successively comes into contact with the plurality of separation blades 17 to produce a swirl flow. The anode off-gas moves downward as such swirling is repeated, and thus water can be favorably separated.

Note that, in this other embodiment (a), the filter 18 may be provided to the water storage portion At provided inside the lower housing 12 as in the embodiment above.

Figure 10:
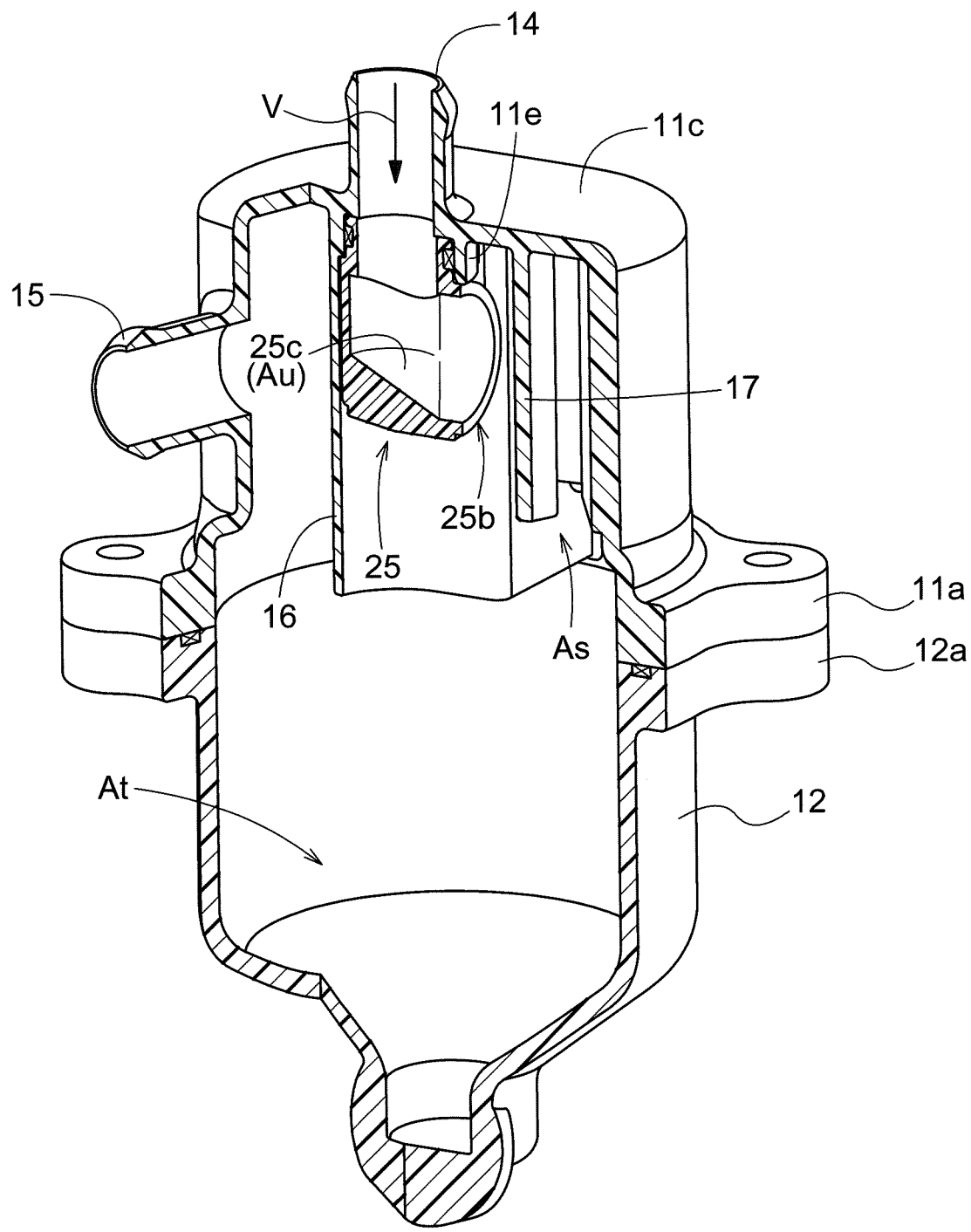
FIG. 10 is a partially cutaway perspective view of a gas-liquid separator in another embodiment (b).
Figure 11:
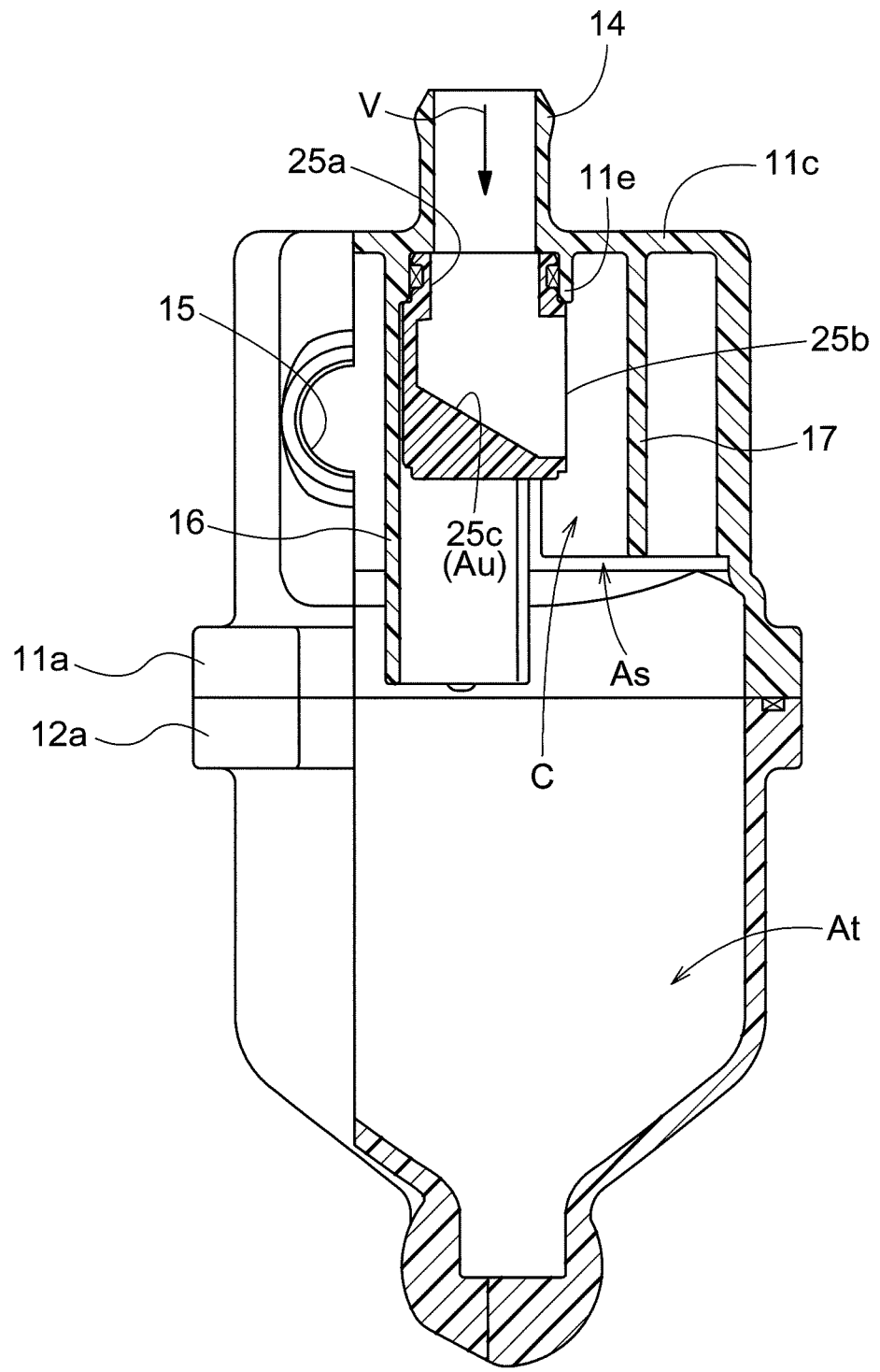
FIG. 11 is a partially cutaway front view of the gas-liquid separator in the other embodiment (b).
Figure 12:
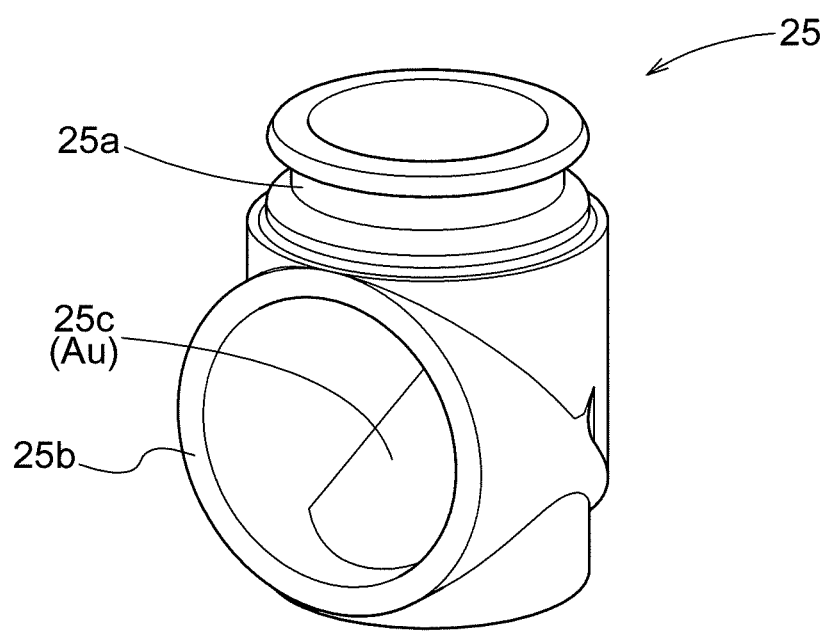
FIG. 12 is a perspective view of a guide member in the other embodiment (b).

(b) As shown in FIGS. 10 to 12, the gas-liquid separating portion As is arranged inside the upper housing 11 included in the housing 10 as in the above-described embodiment (a), the inlet 14 extending upward in the vertical direction is provided in the upper wall 11c of the upper housing 11, and the flow passage V that is in communication with the inlet 14 and passes through the upper wall 11c in the vertical direction and through which the anode off-gas (an example of a water-containing gas) is sent from the upper side to the lower side is provided. In addition, the gas-flow director Au for changing the flow direction of the anode off-gas flowing through the flow passage V, to the horizontal direction is provided in the upper housing 11.

In this other embodiment (b), a separation space that is delimited by the partition wall 16 extending downward from the lower surface of the upper wall 11c of the upper housing 11 and the inner wall of the upper housing 11 is formed, and the plurality of plate-shaped separation blades 17 that extend downward from the lower surface of the upper wall 11c into the separation space are provided in the annular region C.

A fitting tube portion 11e that is concentric with the flow passage V and protrudes downward is provided on the lower surface of the upper wall 11c of the upper housing 11, a guide member 25 that is fitted to the fitting tube portion 11e is provided, and the guide member 25 is provided with the gas-flow director Au. That is, the guide member 25 includes an introduction tube portion 25a that is fitted to the fitting tube portion 11e, a discharge opening 25b that is orthogonal to the flow passage V, and a guiding face 25c (an example of the inclined face) that is inclined to the flow passage V such that the anode off-gas supplied to the introduction tube portion 25a is guided to the discharge opening 25b, and the gas-flow director Au is constituted by this guiding face 25c.

With this configuration, the guide member 25 is attached to the lower surface of the upper wall 11c of the upper housing 11 and the anode off-gas is introduced into the flow passage V from the upper side to the lower side through the inlet 14. Thus, the anode off-gas comes into contact with the guiding face 25c inside the guide member 25, and the flowing direction is changed to the horizontal direction. Then, the anode off-gas successively comes into contact with the plurality of separation blades 17 to produce a swirl flow. The anode off-gas moves downward as such swirling is repeated, and thus water can be favorably separated.

Note that, as a modified example of this other embodiment (b), the gas-flow director Au can also be configured by internally providing no guiding face 25c on purpose and using a guide member 25 constituted by a pipe that is bent such that the anode off-gas supplied to the introduction tube portion 25a is discharged through the discharge opening 25b.

(c) A tubular member can also be used as the flow-passage member 6 shown in the embodiment above. Moreover, in the above-mentioned configuration in which a tubular member is used as the flow-passage member 6, the gas-flow director Au can also be configured such that the anode off-gas is supplied to the gas-liquid separating portion As in the horizontal direction by bending the upper end of the tubular member. Also, it is conceivable that the gas-flow director Au can be constituted by a guiding face that is provided on the inner surface of the upper housing 11 and is inclined to the central axis of the housing 10.

(d) For example, a configuration in which the upper end of the flow-passage member 6 is fitted onto the inner surface of the upper housing 11 or a configuration in which the lower end of the flow-passage member 6 is fitted onto the inner surface of the lower housing 12 may also be employed instead of the configuration as shown in the embodiment above in which the holder 7 is used to hold the flow-passage member 6 (including the tubular member described in the other embodiment (c)) inside the housing 10.

The invention claimed is:
1. A gas-liquid separator comprising:
a housing;
an inlet in the housing;
a flow passage which is in communication with the inlet and through which a water-containing gas supplied through the inlet flows is directed upward in a vertical direction;
a gas-flow director at an upper part of the flow passage in the vertical direction and configured to change a flow direction of the water-containing gas flowing through the flow passage from the vertical direction to a horizontal direction; and
a gas-liquid separating portion arranged higher in the vertical direction than the inlet and configured to bring the water-containing gas, supplied from the gas-flow director into the housing, into contact with a plurality of separation blades in sequence to separate water from the water-containing gas.

2. The gas-liquid separator according to claim 1,
the flow passage is in a vertically elongated flow-passage member disposed inside the housing and configured to send the water-containing gas, introduced through the inlet, upward in the vertical direction through the flow passage, and
the gas-flow director includes:
a horizontal guide face disposed on an inner surface of an upper wall of the housing and configured to allow the water-containing gas, sent further upward in the vertical direction from an upper end of the flow-passage member, to flow in the horizontal direction; and
a guide portion disposed at an upper end portion of the flow-passage member and configured to guide the water-containing gas toward the separation blades of the gas-liquid separating portion.

3. The gas-liquid separator according to claim 2,
wherein the flow-passage member is integral with a holder held on an inner surface of the housing.

4. A gas-liquid separator comprising:
a housing;
an inlet on an upper side of the housing;
a flow passage which is in communication with the inlet and through which a water-containing gas supplied through the inlet flows in a vertical direction;
a gas-flow director configured to bring the water-containing gas, flowing through the flow passage, into contact with an inclined face to change a flow direction of the water-containing gas from the vertical direction to a horizontal direction; and
a gas-liquid separating portion configured to bring the water-containing gas, supplied from the gas-flow director into the housing, into contact with a plurality of separation blades in sequence to separate water from the water-containing gas.

5. The gas-liquid separator according to claim 4,
wherein the separation blades are in an annular region and each extend in the vertical direction, and
the gas-liquid separating portion is configured to bring the water-containing gas, whose flow direction has been changed by the gas-flow director, into contact with the separation blades and swirl the water-containing gas around into a form of a swirl flow to separate water from the water-containing gas.

* * * * *